Aug. 25, 1942.    G. W. PENTHENY    2,294,127
TURBINE NOZZLE CHAMBER CONSTRUCTION
Filed April 10, 1941

WITNESSES:
James R. Mosser
Ronald E. Kaye

INVENTOR
GEORGE W. PENTHENY.
BY
ATTORNEY

Patented Aug. 25, 1942

2,294,127

UNITED STATES PATENT OFFICE 2,294,127

TURBINE NOZZLE CHAMBER CONSTRUCTION

George W. Pentheny, East Lansdowne, Pa., assignor to Westinghouse Electric & Manufacturing Company, East Pittsburgh, Pa., a corporation of Pennsylvania Application April 10, 1941, Serial No. 387,789

3 Claims. (Cl. 253—39)

This invention relates to a turbine cylinder comprising upper and lower halves whose contact faces are held together in compressive engagement by bolts and wherein the halves are provided with internal structures providing nozzle chambers and passages for supplying steam or elastic fluid to the latter, the structures having registering openings so that passages formed in the upper half may supply steam or elastic fluid to the nozzle chambers of the lower half, and it has for an object to provide internal structures having limited contact regions adjacent to the cylinder joint faces and bordering the registering openings.

In a steam turbine having the nozzle ring and blade and dummy ring structures integral with the cylinder it is difficult to avoid leaky joints. The provision of these structures, particularly the nozzle ring structure, are productive of projections which extend radially inward to a substantial extent, these relatively deep projections for the nozzle ring ordinarily having contact faces at the horizontal joint of the cylinder. As these relatively deep projections are subjected to temperature variations, they distort unevenly and produce eccentric loading on the bolts of such magnitude as to result in opening up of the cylinder joint, thereby causing leakage to the outside. While this trouble is corrected to some extent by the use of separate blade and dummy rings, for practical reasons, the nozzle ring is left integral with the cylinder, and it is a more particular object of this invention to provide an integral nozzle ring structure which shall be so constructed and arranged as to avoid opening up of the joint.

Figure 1:
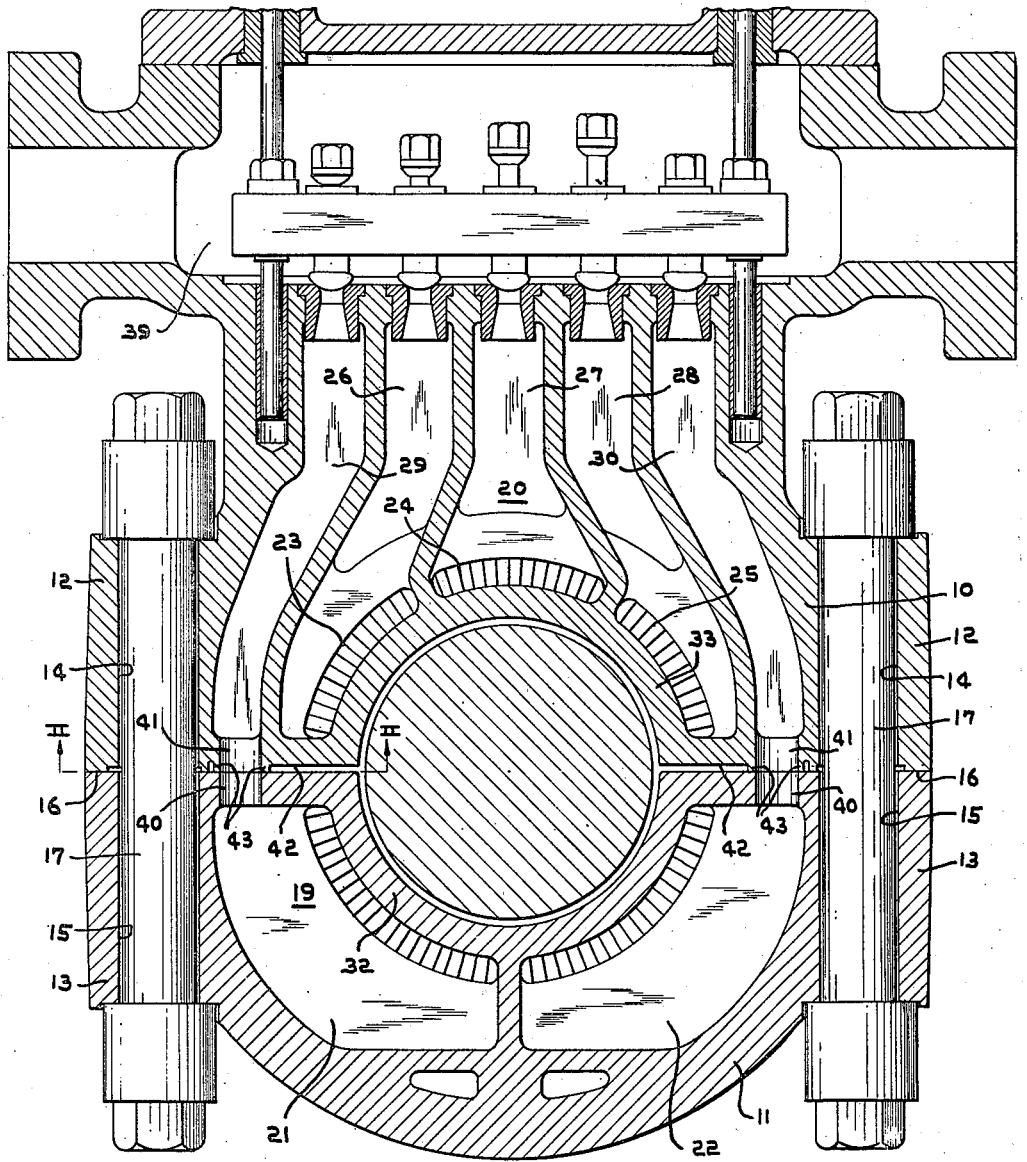
Figure 2:
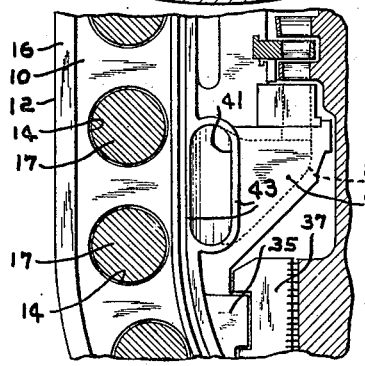

These and other objects are effected by the invention as will be apparent from the following description and claims taken in connection with the accompanying drawing, forming a part of this application, in which:

Fig. 1 is a transverse sectional view showing the improved turbine cylinder; and Fig. 2 is a detail plan view showing a portion of the upper half of the cylinder adjacent to the joint face.

Referring to the drawing more in detail, the turbine cylinder comprises upper and lower halves 10 and 11 provided with relatively thick flange portions 12 and 13 having registering bolt openings 14 and 15, respectively. The upper and lower halves of the cylinder have horizontal or meeting faces at the joint 16, the halves being held together by suitable bolts 17 with the contact or meeting faces 16 in compressive engagement.

The upper and lower cylinder halves 10 and 11 are provided with internal structures, at 19 and 20, which cooperate with the wall portions of the cylinder to provide nozzle chambers 21 and 22 in the lower cylinder half and nozzle chambers 23, 24, and 25 in the upper cylinder half. The structure, at 20, also provides valve passages 26, 27 and 28 for the nozzle chambers 23, 24, and 25 and it cooperates with the wall of the upper cylinder half 11 to provide valve passages 29 and 30 for the nozzle chambers 21 and 22 of the lower half of the cylinder. As shown, the structures, at 19 and at 20, have annular portions 32 and 33 which encompass the spindle in the usual way.

In addition to the very substantial inward extent of the structures, at 19 and 20, with respect to the cylinder wall, the structures for the dummy and blade rings also extend radially inward, the structure 35 for the dummy being shown and those for the blade rings being similar. These structures extending radially inward usually have meeting faces at the horizontal cylinder joint, thereby involving projections extending inwardly from the outer cylinder wall and which are subjected directly to temperature variations; and, because of this, uneven distortion of the cylinder occurs and the cylinder bolts 17 are loaded eccentrically and to such an extent as to result in opening of the joint, causing leakage to the outside. While the employment of separate dummy and blade rings 37 makes possible limited inward extent of the structures 35, for practical reasons, the nozzle ring, provided by the structures, at 19 and at 20, is usually left integral with the cylinder.

The valve passages 26, 27, 28, 29, and 30 supply steam from the steam chest 39 to the nozzle chambers 21, 22, 23, 24, and 25, respectively, primary, secondary, tertiary and quaternary nozzle groups being in communication with the nozzle chambers in the usual way.

The internal structures, at 19 and at 20, cooperate with the cylinder wall to provide registering openings 40 and 41 and such structures are spaced apart radially, as shown at 42 in Fig. 1, except for the relatively narrow contact regions of ribs 43 adjacent to the meeting faces of the joint and bordering the registering openings 40 and 41. Thus, contact of the internal structures and extending radially inward to a substantial extent is very largely removed, leaving only the relatively thin wall or rib portions 43 immediately surrounding the passages 40 and 41. By having the passages 40 and 41 formed relatively narrow in a radial direction, as will be seen from Fig. 2, and by having the relatively narrow contact regions 43, it will be seen that the bolts 17 produce compressive stress in the limited contact regions encompassing the registering openings to keep these regions in contact at all times, thus leaving the internal structures free to expand without affecting the bolts.

While the invention has been shown in but one form, it will be obvious to those skilled in the art that it is not so limited, but is susceptible of various changes and modifications without departing from the spirit thereof, and it is desired, therefore, that only such limitations shall be placed thereupon as are specifically set forth in the appended claims.

What is claimed is:

1. In a turbine, a cylinder including upper and lower halves having meeting joint faces; structure integral with the lower half and providing nozzle chambers having openings extending through the upper face thereof; structure integral with the upper cylinder half and providing nozzle chambers and providing valve passages for supplying motive fluid to the latter and to the nozzle chambers of the lower half; said valve passages for the nozzle chambers of the lower half terminating in openings which extend through the lower face of the structure of the upper half and register, respectively, with the first openings; said structures being spaced apart except for relatively narrow contact regions bordering the openings; and bolts for fastening the upper and lower halves together with said contact regions engaged compressively.

2. In a turbine, a cylinder including upper and lower halves having meeting joint faces; structure integral with the lower half and providing nozzle chambers having openings extending through the lower face thereof; structure integral with the upper cylinder half and providing nozzle chambers and providing valve passages for supplying motive fluid to the latter and to the nozzle chambers of the lower half; said valve passages for the nozzle chambers of the lower half terminating in openings which extend through the lower face of the structure of the upper half and register, respectively, with the first openings; said structures extending radially inward from the wall portions to provide said nozzle chambers, passages, and openings and said structures being spaced apart except for relatively narrow contact regions bordering the registering openings; and bolts for fastening the upper and lower halves together with said contact regions engaged compressively.

3. The combination as claimed in claim 1 wherein the registering openings are elongated in a direction lengthwise of the turbine cylinder in order to limit the inward radial extent of the internal structures.

GEORGE W. PENTHENY.